United States Patent [19]
Pettersson et al.

[11] Patent Number: 5,839,004
[45] Date of Patent: Nov. 17, 1998

[54] DEVICE AND METHOD FOR FACILITATING THE FOCUSING OF A CAMERA

[75] Inventors: Erland Pettersson, Mölnlycke; Per Nordlund, Göteborg, both of Sweden

[73] Assignee: Victor Hasselblad AB, Sweden

[21] Appl. No.: 894,987

[22] PCT Filed: Feb. 29, 1996

[86] PCT No.: PCT/SE96/00257

§ 371 Date: Nov. 19, 1997

§ 102(e) Date: Nov. 19, 1997

[87] PCT Pub. No.: WO96/27149

PCT Pub. Date: Sep. 6, 1996

[30] Foreign Application Priority Data

Mar. 1, 1995 [SE] Sweden ................................ 9500746

[51] Int. Cl.[6] ................................................ G03B 13/24
[52] U.S. Cl. ................................................ 396/152
[58] Field of Search ................................ 396/152, 150, 396/151, 144, 145, 146, 342, 363, 372

[56] References Cited

U.S. PATENT DOCUMENTS

| | | | |
|---|---|---|---|
| 3,864,712 | 2/1975 | Von Stwolinski | 396/150 |
| 4,429,964 | 2/1984 | Schaefer . | |
| 4,496,231 | 1/1985 | Heitmann et al. . | |
| 4,602,860 | 7/1986 | Hoffman | 396/150 |
| 5,034,764 | 7/1991 | Inabata . | |
| 5,534,959 | 7/1996 | Keelan et al. | 396/363 X |

FOREIGN PATENT DOCUMENTS

| | | |
|---|---|---|
| 338708 | 7/1968 | Sweden . |
| 454468 | 5/1988 | Sweden . |

*Primary Examiner*—W. B. Perkey
*Attorney, Agent, or Firm*—Lerner, David, Littenberg, Krumholz & Mentlik

[57] ABSTRACT

A device and a method for facilitating the focusing of a camera during a so-called tilt operation, in which an image plane/focusing plane of a camera is angled relative the optical axis of an objective lens or vice versa, in order to obtain an inclined plane of focus, the camera being provided with a focusing screen located in said image plane/focusing plane and an optical viewing location, the optical axis which coincides with the optical axis of said focusing screen, said tilt operation resulting in the exiting light from the focusing screen being directed away from said viewing location, wherein an optical wedge is located between said focusing screen and said viewing location in such a way as to redirect the exiting light to said viewing location at which an eyepiece or an observer's eye is located. In a preferred embodiment, said optical wedge is a fresnel prism plate located adjacent to said focusing screen on the side of the exiting light.

8 Claims, 2 Drawing Sheets

DEVICE AND METHOD FOR FACILITATING THE FOCUSING OF A CAMERA

TECHNICAL FIELD

The present invention relates to a device and a method for facilitating the focusing of a camera, more particularly for the focusing of a camera during a so-called tilt operation in which an image plane/focusing plane of the camera is angled relative the optical axis of an objective lens or vice versa, in order to obtain an inclined plane of focus in accordance with the so-called Scheimpflug theorem.

BACKGROUND OF THE INVENTION

The viewfinder of a camera includes a focusing screen, on which the image of the selected object is projected. Said focusing screen is located in the image plane/focusing plane of the camera and the projected image on the focusing screen may thus be used for focusing adjustment. The focusing screen normally comprises a matte surface and a thin, positive fresnel lens abutting said matte surface. The fresnel lens serves to redirect the light from the matte surface (and especially from its edges) towards an observer's eye or an eyepiece, through which the image on the focusing screen is observed. The fresnel lens thus helps to obtain an evenly distributed light-intensity across the entire image-area.

The focusing screen is normally positioned perpendicularly to the optical axis of the camera. In some cameras, however, it is possible to angle or "tilt" the image plane/focusing plane relative the optical axis of an objective lens or vice versa, in a so-called tilt operation in order to obtain an inclined plane of focus. This helps the photographer to decide more easily which parts of the object that are to be in focus.

However, a serious problem arises when the incident light falls at an angle to a focusing screen comprising a fresnel lens.

The problem lies in that the exiting light has virtually the same direction as the incident light, which means that the light is directed away from the observer's eye or the eyepiece normally located directly above the center of the focusing screen. Thus, only a small fraction of the exiting light from the focusing screen can be viewed by the photographer, which makes focusing very difficult or—at larger tilt angles—impossible.

If the eyepiece is moved sideways so as to catch the exiting light, the photographer is forced to look through the eyepiece at an angle, which means that the eyepiece is used in an optically very unfavourable manner.

SUMMARY OF THE INVENTION

It is therefore an object of the present invention to provide a device and a method for facilitating the focusing of a camera during a tilt operation, in order to compensate for the drawbacks described above.

This object is achieved in accordance with the present invention by means of a device and a method for facilitating the focusing of a camera during a so-called tilt operation, in which an image plane/focusing plane of a camera is angled relative the optical axis of an objective lens or vice versa, in order to obtain an inclined plane of focus, the camera being provided with a focusing screen located in said image plane/focusing plane and an optical viewing location, the optical axis of which coincides with the optical axis of said focusing screen, said tilt operation resulting in the exiting light from the focusing screen being directed away from said viewing location, wherein an optical wedge is located between said focusing screen and said viewing location in such a way as to redirect the exiting light to said viewing location at which an eyepiece or an observer's eye is located.

In a preferred embodiment, said optical wedge is a fresnel prism plate located adjacent to said focusing screen on the side of the exiting light.

In an advantageous embodiment of the invention, a plurality of fresnel prism plates having progressively larger deflection angles, are removably insertable adjacent to said focusing screen.

Said deflection angles preferably range from 0 to 30 degrees.

BRIEF DESCRIPTION OF THE DRAWINGS

The present invention will now be described in more detail, by way of example only, and with reference to the attached drawings, in which.

DESCRIPTION OF PREFERRED EMBODIMENTS OF THE INVENTION

Figure 1:
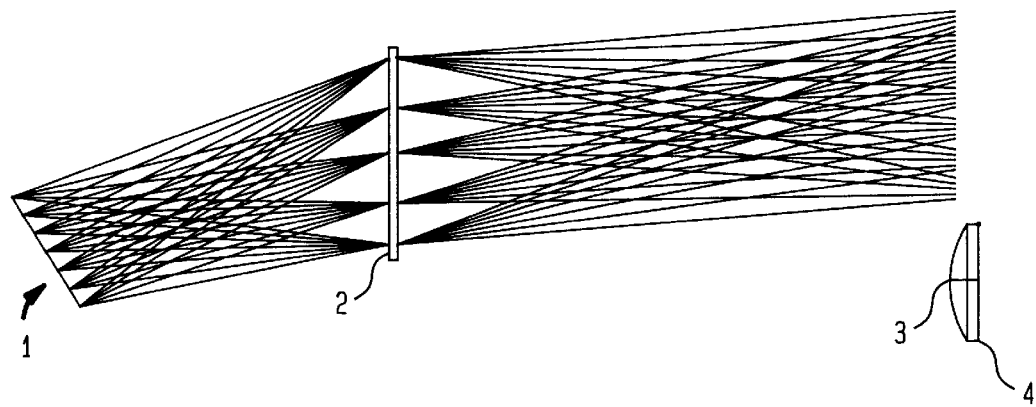
FIG. 1 schematically illustrates a conventional camera during a tilt operation, showing how the exiting light from the focusing screen is directed away from the eyepiece.
Figure 2:
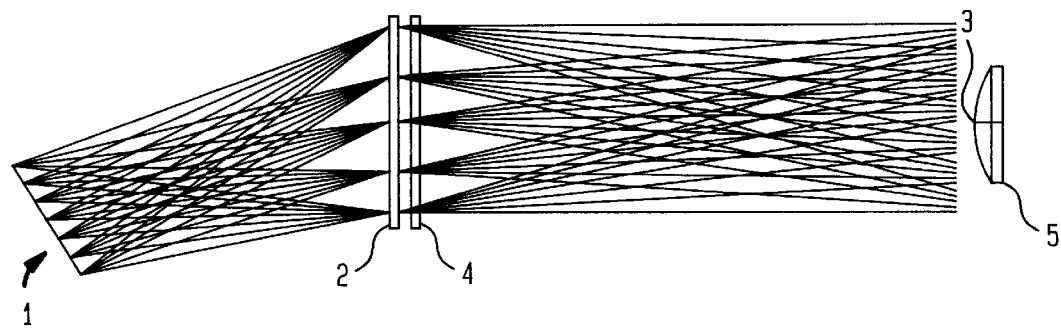
FIG. 2 schematically illustrates a camera provided with a device in accordance with the invention, during a tilt operation, showing how the exiting light from the focusing screen is redirected to the eyepiece by means of an optical wedge in the form of a fresnel prism plate.

In FIG. 1 a much simplified illustration of a conventional camera is shown during a tilt operation and this helps to demonstrate the problems underlying the present invention. FIG. 2 shows an almost identical camera, but provided with a device in accordance with the invention. FIGS. 1 and 2 both schematically depict the exit pupil of an objective lens denoted by reference numeral 1, a focusing screen 2 and an optical viewing location 3, the optical axis of which coincides with the optical axis of said focusing screen 2.

An observer's eye or an eyepiece 5 (as shown in the figures) is located in said optical viewing location 3. In a conventional manner, the focusing screen 2 comprises a matte surface and a thin, positive fresnel prism (not shown).

In FIG. 1 it is clearly seen how the exiting light from the focusing screen 2 is directed away from the eyepiece 5 so that very little light reaches it. In this situation the focusing procedure is clearly made very difficult.

In FIG. 2, however, a device in accordance with the invention is provided, during a tilt operation. The figure shows how the light exiting from the focusing screen is redirected to the eyepiece 5 by means of an optical wedge in the form of a fresnel prism plate 4, located between said focusing screen 2 and said viewing location 5. The prism plate 4 is more particularly located adjacent to said focusing screen 2 on the side of the exiting light. The exact distance between the prism plate 4 and the focusing screen is however not critical.

In the preferred embodiment of the invention, a plurality of fresnel prism plates 4, having progressively larger deflection angles, are removably insertable adjacent to said focusing screen.

Said deflection angles preferably range from 0 to 30 degrees. In practice, two prism plates 4 are used to cover said range of deflection angles.

Figure 3:
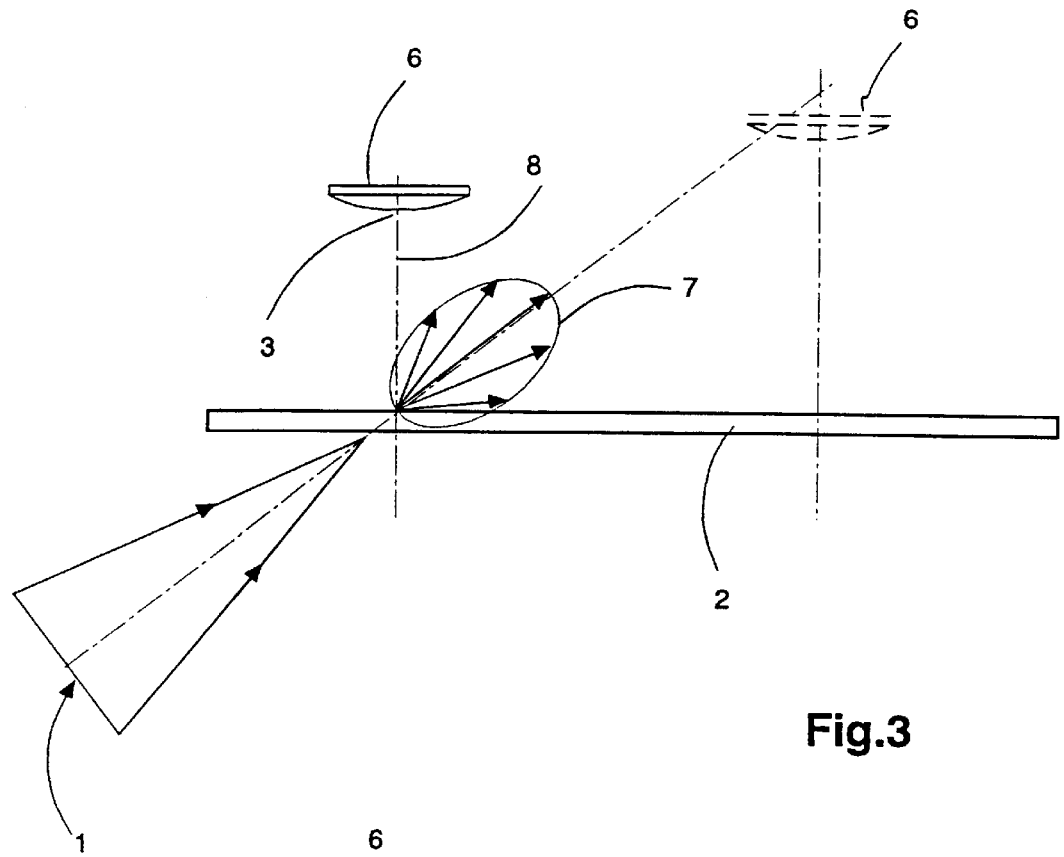
FIG. 3 schematically shows a prior art situation in a large-format camera provided with a magnifying lens, during a tilt operation.
Figure 4:
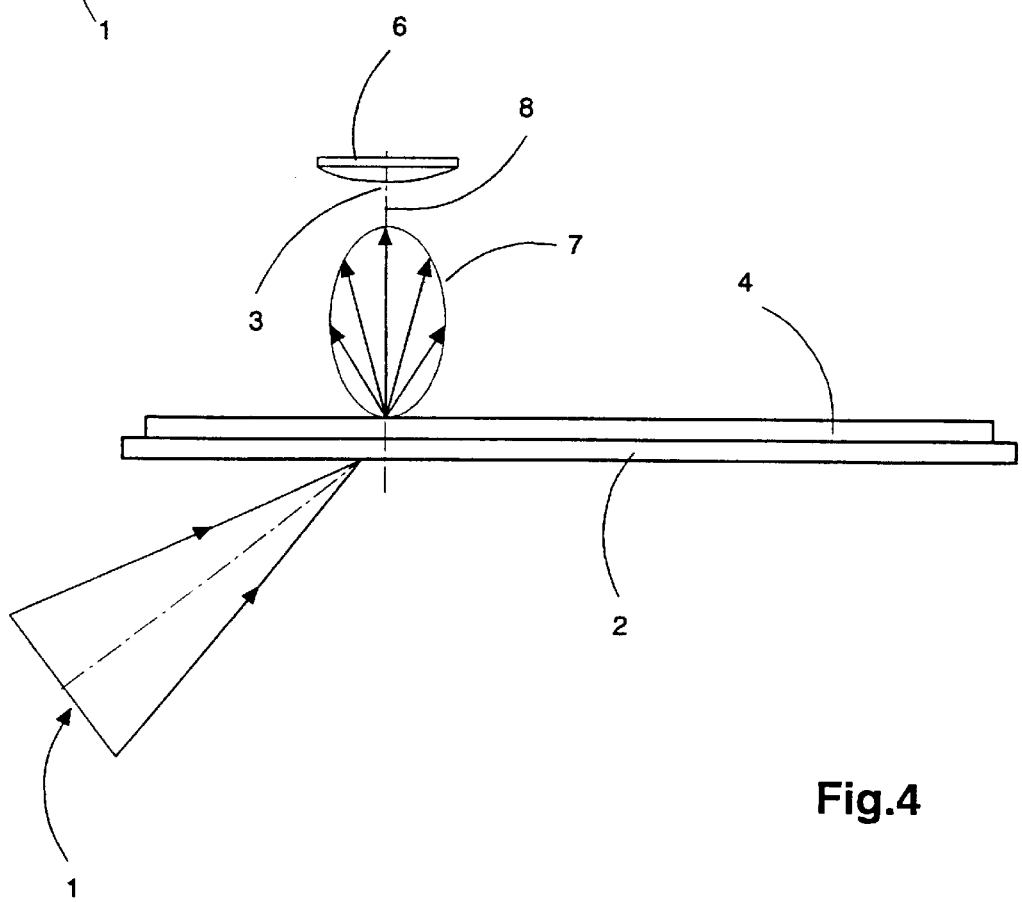
FIG. 4 schematically shows a large-format camera provided with a magnifying lens, and a fresnel prism plate in accordance with the invention during a tilt operation.

FIGS. 3 and 4 schematically show a similar application in a large-format camera provided with the exit pupil of an objective lens 1, a focusing screen 2 and an optical viewing location 3, at which a magnifying lens 6 is located. FIG. 3 thus shows a conventional camera representing the state of the art. At the large tilt-angle shown, the light-lobe 7 exiting the focusing plane 2 is directed at such an angle to the optical axis 8 of the magnifying lens 6, that the brightness of the screen 2 is fairly low. In this application, i.e. in a large-format camera, the magnifying lens 6 may however be moved sideways so as to improve the screen brightness, but the photographer is then forced to look through the eyepiece at an angle, which means that the magnifying lens 6 is used in an optically very unfavourable manner.

By placing an optical wedge, here in the form of a fresnel prism plate 4 shown in FIG. 4, the light-lobe exiting from the focusing screen 2 is redirected towards the magnifying lens 6 in its optimum position directly above the optical axis of the focusing screen 2.

The invention is not restricted to the embodiments described above or shown in the drawings, but may be varied within the scope of the appended claims.

We claim:

1. A device for facilitating the focusing of a camera during a so-called tilt operation, in which an image plane/focusing plane of the camera is angled relative the optical axis of an objective lens (1) or vice versa, in order to obtain an inclined plane of focus, the camera being provided with a focusing screen (2) located in said image plane/focusing plane and an optical viewing location (3), the optical axis of which coincides with the optical axis of said focusing screen (2), said tilt operation resulting in the exiting light from the focusing screen being directed away from said viewing location (3), characterized in that optical wedge (4) is located between said focusing screen (2) and said viewing location (3) in such a way as to redirect the exiting light to said viewing location (3) at which an eyepiece (5) or an observer's eye is located.

2. A device according to claim 1, characterized in that said optical wedge (4) is a Fresnel prism plate located adjacent to said focusing screen (2) on the side of the exiting light.

3. A device according to claim 2, characterized in that a plurality of Fresnel prism plates (4), having progressively larger deflection angles, are removably insertable adjacent to said focusing screen (2).

4. A device according to claim 3, characterized in that said deflection angles range from 0° to 30°.

5. Method for facilitating the focusing of a camera during a so-called tilt operation in which an image plane/focusing plane of the camera is angled relative the optical axis of an objective lens (1) or vice versa, in order to obtain an inclined plane of focus, the camera being provided with a focusing screen (2) located in said image plane/focusing plane and an optical viewing location (3), the optical axis of which coincides with the optical axis of said focusing screen, said tilt operation resulting in the exiting light from the focusing screen being directed away from said viewing location (3), characterized in that an optical wedge (4) is placed between said focusing screen (2) and said viewing location (3) in such a way as to redirect the exiting light to said viewing location (3) at which an eyepiece (5) or observer's eye is located.

6. Method according to claim 5, characterized in that said optical wedge (4) is a Fresnel prism plate which is inserted adjacent to said focusing screen (2) on the side of the exiting light.

7. Method according to claim 6, characterized in that a plurality of Fresnel prism plates, having progressively larger deflection angles, are removably inserted adjacent to said focusing screen (2).

8. Method according to claim 7, characterized in that said deflection angles range from 0° to 30°.

* * * * *

UNITED STATES PATENT AND TRADEMARK OFFICE
CERTIFICATE OF CORRECTION

PATENT NO. : 5,839,004
DATED : November 17, 1998
INVENTOR(S) : Pettersson et al.

It is certified that error appears in the above-identified patent and that said Letters Patent is hereby corrected as shown below:

In the Abstract, line 7, "axis which" should read --axis of which--.

Column 3, line 38, "that optical" should read --that an optical--.

Signed and Sealed this

Twenty-seventh Day of April, 1999

Attest:

Q. TODD DICKINSON

*Attesting Officer*     *Acting Commissioner of Patents and Trademarks*